(12) United States Patent
Ochiai (10) Patent No.: US 6,196,691 B1
(45) Date of Patent: *Mar. 6, 2001

(54) LIGHT GUIDE PLATE FOR POINT SOURCE (75) Inventor: Shin-Ichiro Ochiai, Yao (JP)

(73) Assignee: Shimada Precision, Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,182

(22) Filed: Mar. 31, 1999

(30) Foreign Application Priority Data

Apr. 1, 1998 (JP) ................................................ 10-088608

(51) Int. Cl.$^7$ ...................................................... F21V 7/04
(52) U.S. Cl. ........................... 362/31; 362/555; 362/558; 362/561; 349/62; 349/65
(58) Field of Search .................................. 362/26, 27, 28, 362/29, 30, 31, 555, 558, 560, 561; 349/65, 62, 112; 385/10

(56) References Cited

U.S. PATENT DOCUMENTS 5,703,667   12/1997   Ochiai ................................ 349/65
6,011,602 *  1/2000   Miyashita et al. ................... 349/65

FOREIGN PATENT DOCUMENTS 9-325218   12/1997   (JP) .

* cited by examiner

Primary Examiner—Stephen Husar
Assistant Examiner—John Anthony Ward
(74) Attorney, Agent, or Firm—Nixon & Vanderhye P.C.

(57) ABSTRACT

Rays of light from three light-emitting diodes 5 incident at a thicker side end edge 2c of a light guide plate 2 made of a transparent plate. A ratio of grating part width/non-grating part width in a unit width of a diffraction grating 3 provided on a rear surface 2b of the light guide plate 2 is varied, and grating constant of a diffraction grating 4 of a front surface 2a provided perpendicularly to the diffraction grating 3, is set to a fixed value smaller than a mean grating constant of the diffraction grating of the rear surface 2b, so that uniform, high brightness at the front surface 2a of the light guide plate 2 can be obtained. Therefore, the light guide plate can perform high, uniform brightness over a whole illuminating surface even with a point light source, and yet can prolong life of batteries by virtue of reduction in power consumption of the light source.

4 Claims, 6 Drawing Sheets

LIGHT GUIDE PLATE FOR POINT SOURCE

BACKGROUND OF THE INVENTION

The present invention relates to a light guide plate for use as a backlight plate in a liquid crystal display device or an emission guide plate.

Figure 6:
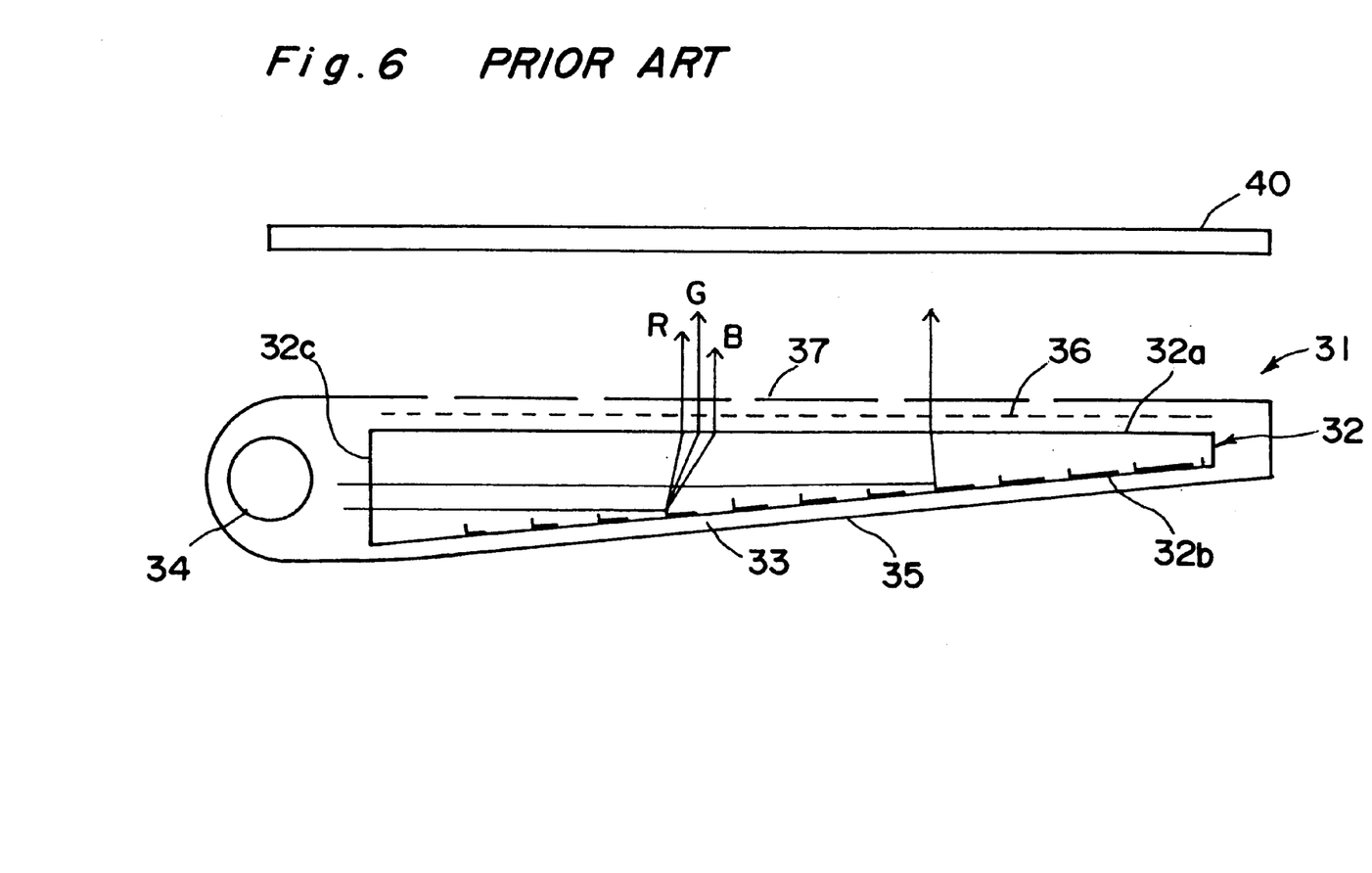
FIG. 6 is a sectional view showing a planar surface illuminator according to the prior art.

Recently, the present applicant has proposed a planar surface illuminator to be used for backlight in liquid crystal displays as shown in FIG. 6 (Japanese Patent Laid-Open Publication HEI 09-325218). This planar surface illuminator 31, which is provided below a liquid crystal display panel 40, comprises a light guide plate 32 made of transparent plastic resin and having a diffraction grating 33 provided on a rear surface 32b, a fluorescent tube 34 having a cold cathode or semi-hot electrode as a light source placed along a thicker end side edge 32c of the light guide plate 32, a reflector 35 which surrounds and covers the light guide plate, except its front surface 32a, as well as the fluorescent tube 34 to reflect light, a diffusion plate 36 placed parallel to the light guide plate on its front surface 32a side, and a prism sheet 37 for light collection placed parallel to the diffusion plate 36 on its front surface side.

The diffraction grating 33 is formed by molding in the form of minute ruled grooves on the rear surface 32b which is inclined at an angle of 0.5 to 5° so as to be able to receive on its entire surface light that comes incident generally horizontally from the fluorescent tube 34, where the distance d between adjacent grooves in the diffraction grating 33 is set so that diffracted light rays of low-order according to a later-described relational equation (1) of diffraction go out from the front surface 32a of the light guide plate generally vertically and in a direction coincident with the direction of total reflection. Also, a ratio of grating part width/non-grating part width in a unit width of the diffraction grating 33 (heavy-line length/thin-line length of each division) schematically shown as eleven divisions in the figure is set so as to increase gradually with increasing distance from the end edge 32c in order that the quantity of diffracted light increases with decreasing quantity of light that comes up from the fluorescent tube 34. In addition, the divisions are actually provided in numbers far greater than eleven, for example, around 1000.

In this planar surface illuminator 31 of the prior art, white light emitted from the fluorescent tube 34 enters the light guide plate 32 generally horizontally at the end edge 32c, impinges on the whole rear surface 32b inclined at an angle of 0.5 to 5°, and is diffracted by a synergistical cooperating effect of adjacent smooth surfaces between each numerous ruled grooves of the diffraction grating 33 which is provided over the whole rear surface 32b and whose groove interval, namely grating constant d is on the order of submicrons to several tens of microns (0.1 to 10 $\mu$m), so that high intensity diffracted light of low-order (e.g., 1st- to 3rd-order) go out generally vertically from the front surface 32a of the light guide plate 32 as shown by an arrow in the figure. Thus, far higher-intensity outgoing light can be obtained, as compared with the conventional multiplicity of trigonal-pyramid prism surfaces in which one side edge is long as much as 0.16 mm, and at which each ray of light is totally reflected as a sum of light quanta geometrically-optically and individually without cooperation with neighborhoods. In addition to this, because grating part width/non-grating part width in unit width of the diffraction grating 33, i.e. the diffraction efficiency of the grating (ratio of diffracted light intensity to incident light intensity), increases with increasing distance from the end edge 32c on the fluorescent tube 34 side, the quantity of diffracted light increases in proportion to decreases in the quantity of light due to increasing distance from the light source. In this way, the front surface 32a of the light guide plate 32 is illuminated with high brightness and great uniformity.

It is noted that since the white light emitted from the fluorescent tube 34 has a spectral distribution having peaks at blue (B), green (G) and red (R), the diffracted light is separated as shown by arrows R, G and B in FIG. 6 according to a later-described relational equation (1) of diffraction, but changed into the original white light by passing through the diffusion plate 36 placed in the front and then collected by the prism sheet 37 placed in the front, thus going out. As a result, the liquid crystal display panel 40 is illuminated with separation-free white light from below with high brightness and yet uniformity.

Also, the light guide plate 32 except its front surface as well as the fluorescent tube 34 are covered with the reflector 35. Therefore, almost all the light of the fluorescent tube 34 is caused to be incident on the light guide plate 32, so that the liquid crystal display panel 40 is illuminated with even higher brightness.

As an experimental example of high-brightness, uniform illumination of the light guide plate 32, a light guide plate having a diffraction grating with d=3 $\mu$m was fabricated by using a mold which is formed with a ruled pattern by micromachining, and surface brightness at a position 100 mm distant from an end edge on the light source side was compared with similar surface brightness of a conventional light guide plate having an about 300 $\mu$m print pattern. This comparison has proved that the former surface brightness is twice brighter than the latter. Accordingly, this light guide plate 32 is capable of offering high-brightness backlight even with a fluorescent tube 34 involving less power consumption. Therefore, applying the light guide plate 32 to battery-driven liquid crystal displays allows the life of the batteries to be prolonged double, and applying the light guide plate 32 to battery-driven liquid crystal televisions enables image watching in the light open air.

For the prior-art light guide plate 32 proposed by the present applicant, it is a presumption for high-brightness, uniform planar illumination that the fluorescent tube 34 is extending along the end edge 32c of the light guide plate 32, so to speak, as a line light source.

However, it has been becoming more often the case that the fluorescent tube 34 cannot be used due to the demand for more compactness of the light guide plate 32 in keeping with downsizing of the liquid crystal display panel 40 or for savings in power consumption so that several small, power-saving point light sources such as light-emitting diodes must inevitably be used to make up the backlight.

Figure 2:
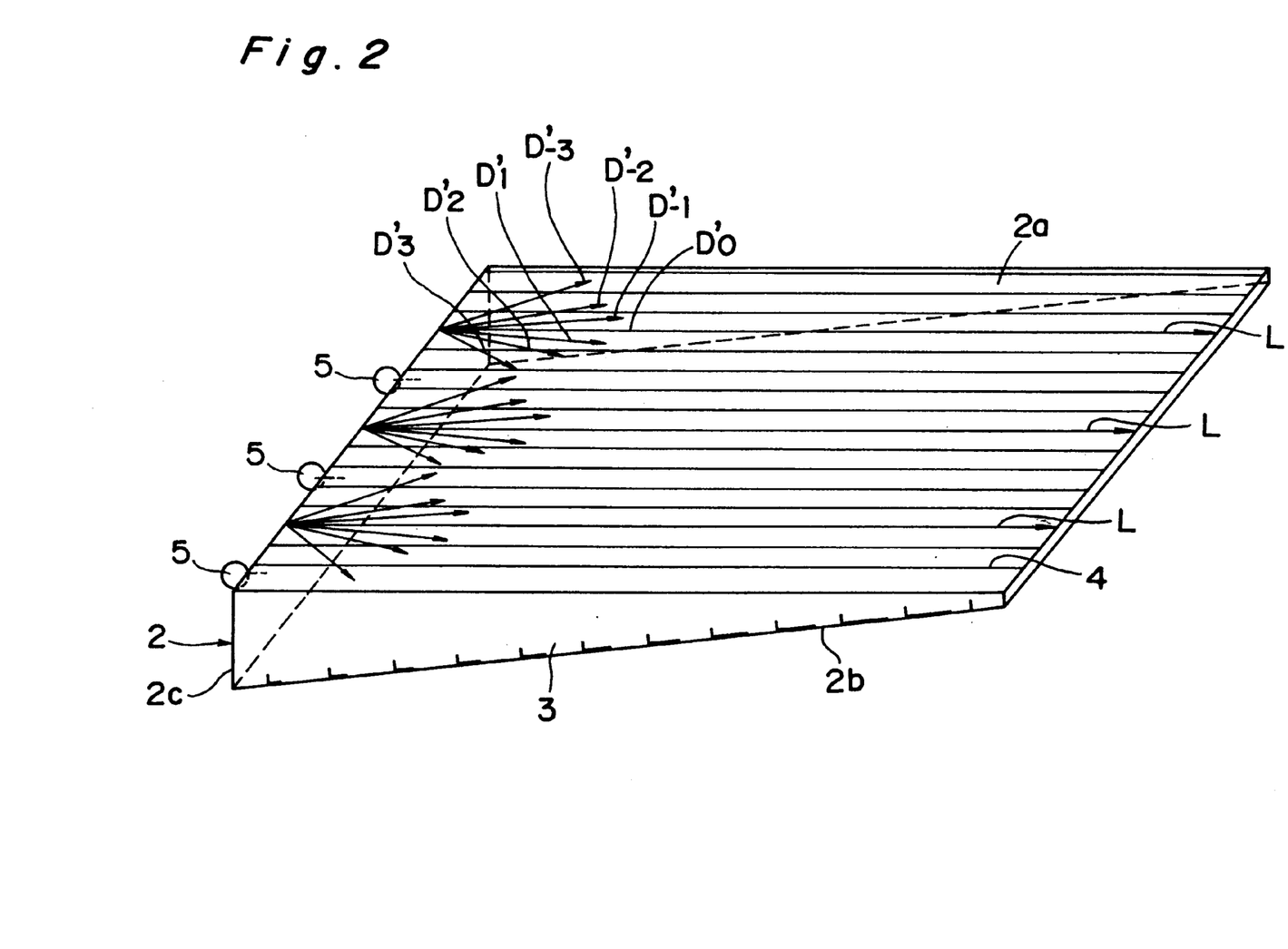
FIG. 2 is a perspective view showing one embodiment of the light guide plate as described in claim 1 of the present invention.

Unfortunately, for example, when three light-emitting diodes, arranged at the thicker end side edge 32c of the conventional light guide plate 32 as shown in FIG. 2, are lit, the result would be only that three bright lines L extending in straight line longitudinally from the light-emitting diodes appear on the front surface 32a of the light guide plate 32. This brightness could not be spread laterally, so that intermediate portions between adjacent bright lines L a nd L would be dark, causing a problem that liquid crystal display panels sized over about 2×4 inches could not be illuminated with high brightness and uniformity.

SUMMARY OF THE INVENTION

It is therefore an object of the present invention to provide a light guide plate in which diffraction gratings are provided so as to allow longitudinal bright lines from point light sources to be spread laterally on the surface of the light guide plate, so that the light guide plate is capable of obtaining high, uniform brightness over the entire illuminating surface even with use of point light sources and moreover that the life of batteries can be prolonged by virtue of reduction in power consumption of the light sources.

In order to achieve the aforementioned object, there is provided a light guide plate comprising:

a transparent plate; and diffraction gratings provided on both rear and front surfaces of the plate and diffracting light incident from one or more point light sources at at least one end face of the plate; wherein a ratio of grating part width/non-grating part width in a unit width, or cross-sectional shape, of the diffraction grating of the rear surface is varied, and the diffraction grating of the front surface is provided perpendicularly to the diffraction grating of the rear surface, while grating constant of the grating on the front surface is set to a fixed value smaller than a mean grating constant of the diffraction grating on the rear surface or the cross-sectional shape of the diffraction grating on the front surface is set to such a specified shape that high-order diffracted light is diffracted at high efficiency, whereby uniform, high brightness at the front surface of the light guide plate can be obtained.

As illustrated in FIG. 1A, when a reflection-type diffraction grating 3 (ruled grooves) is formed with grating constant d, as an example, on a rear surface 2b of a light guide plate 2 made of a transparent plate member, light from a point light source located on one end face 2c of the light guide plate 2 comes incident toward the rear surface 2b within the sheet plane of FIG. 1A as shown by arrows I, and is diffracted by the diffraction grating 3 toward a front surface 2a as shown by arrows $D_1$, $D_2$, $D_3$, where between incident light I and diffracted light D, the following equation (1) holds:

$$(\sin i - \sin \theta) = \pm m(\lambda/d) \tag{1}$$

where i is the incident angle, θ is the angle of diffraction, λ is the wavelength of light, and m is an integer.

$D_1$, $D_2$, $D_3$ in the figure indicate directions of diffracted light when m in Equation (1) is substituted by 1, 2, 3, respectively. The first-order diffracted light $D_1$, in which the incident angle on the front surface 2a is larger than a critical angle φ (e.g., φ=42° for an acrylic light guide plate), is totally reflected by the front surface 2a so as to be led far within the light guide plate 2. The second-order, third-order diffracted light $D_2$, $D_3$, in which the incident angle on the front surface 2a is smaller than the critical angle φ, goes outward from the front surface 2a. Accordingly, if the grating constant d is appropriately determined with respect to the wavelength λ of the point light source by controlling the incident angle i on the rear surface 2b so that low-order (e.g., m=3) diffracted light goes out from the front surface 2a in a direction generally perpendicular to this surface while the even lower-order (e.g., m=1) diffracted light is led farther away within the light guide plate. The front surface 2a of the light guide plate 2 is illuminated very brightly by the high-intensity outgoing light that goes out in a direction generally normal to the front surface 2a while the totally reflected internal light is led farther away within the light guide plate at a line intersecting the vertical plane including the point light source, which plane is the sheet surface of FIG. 1A. In addition, when various dimensions involved are controlled so that the direction of diffraction, which is the direction generally normal to the front surface 2a, and the direction of total internal reflection of incident light determined by the inclination angle of the groove in the sectional profile of the ruled grooves become coincident with each other, i.e., when the groove shape of the diffraction grating is blazed, bright lines of the highest brightness can be obtained, and these bright lines correspond to the three bright lines L in FIG. 2.

In the light guide plate 2, the ratio of grating part width/non-grating part width in unit widths is gradually changed, or cross-sectional shape, of the diffraction grating 3 of the rear surface 2b is changed, so that the brightness of the bright lines L at the front surface 2a of the light guide plate are controlled to be uniformized. More specifically, in the light guide plate 2, for example, as the distance from one end face 2c of the light guide plate 2 on the light source side increases, i.e., as the quantity of light coming up from the point light source decreases, the cross-sectional shape is changed from sine wave to sawtooth wave shape, or the ratio of grating part width/non-grating part width in unit widths gradually increases, as an example. Accordingly, the light from the point light source is weakly diffracted on one end face 2c side wherewith a higher light quantity, and increasingly more diffracted on increasingly far side wherewith the smaller light quantity. As a result, the bright lines L at the front surface 2a of the light guide plate appear with quite high and uniform brightness.

Also, as shown in FIG. 1B, which is a sectional view taken along the line b—b of FIG. 1A, on the front surface 2a of the light guide plate 2, a transmission diffraction grating 4 perpendicular to the diffraction grating 3 of the rear surface 2b is provided with a fixed grating constant d'. Therefore, diffracted light $D_2$, $D_3$ which looks as a bright line L and which goes out in a direction generally normal to the front surface 2a, when going out, is diffracted by this diffraction grating 4 of the front surface 2a. In this case, if the incident angle is i' (=0) and the angle of diffraction is θ' as shown in FIG. 1B, then an equation, $-\sin \theta' = \pm m(\lambda/d')$, holds from the aforementioned relational equation (1).

Therefore, if the grating constant d' of the diffraction grating 4 of the front surface is set to a constant value smaller than the mean grating constant d of the diffraction grating 3 of the rear surface, then the values of θ' satisfying the above equation for m=1, 2, 3, respectively, are greater than the value of θ, meaning that the angle of diffraction by the diffraction grating 4 of the front surface is greater than that of the rear surface. Accordingly, the diffracted light, or outgoing light, is largely spread as shown by $D_0'$, $D_1'$, $D_{-1}'$, $D_2'$, $D_{-2}'$, $D_3'$, $D_{-3}'$ of FIGS. 1B and 2, illuminating between adjacent bright lines L, L with high, uniform brightness. As a result, a uniform, high-brightness illuminating surface 2a can be obtained.

Similarly, when the cross-sectional shape of the diffraction grating 4 of the front surface is set to a specified shape such as a sawtooth wave shape with the angle of teeth adjusted (see FIG. 4D) in which high-order diffracted light having a large value of m in the grating equation (1) is diffracted at high efficiency, more spreading diffracted light on the outer side in FIG. 1B is increased in intensity so that a uniform, high-brightness illuminating surface 2a can be obtained likewise.

The technique by diffraction grating of the present invention essentially differs from, for example, the conventional polygonal prism in which individual prisms totally reflect light independently without cooperation, in that the grating constant d is on the order of submicrons to several tens of microns (0.1–10 μm), which is an order of 1/100 as compared with the length of one side edge of the prism, so that adjacent planar surfaces between each numerous minutely ruled grooves synergistically cooperate to cause light having wave characteristic to be exceedingly strong diffracted, thus allowing an exceedingly high-brightness illuminating surface 2a to be obtained. In addition, a light guide plate having such a diffraction grating can be made by, for example, molding through the use of a die having ruled grooves internally formed by machining or having an electroformed hologram film of diffraction grating internally lined, or directly machining or printing ruled grooves on the rear surface of the light guide plate or bonding on the rear surface a film having such grooves printed or holographically formed.

Also, there is provided a light guide plate comprising:
a transparent plate; and
diffraction gratings provided on both rear and front surfaces of the plate and diffracting light incident from one or more point light sources at a rear surface of the plate; wherein
the diffraction grating of the front surface and the diffraction grating of the rear surface are provided perpendicularly to each other, while grating constants of the diffraction gratings, or cross-sectional shapes of the diffraction gratings, are so set that uniform, high brightness at the front surface of the light guide plate can be obtained.

Figure 5:
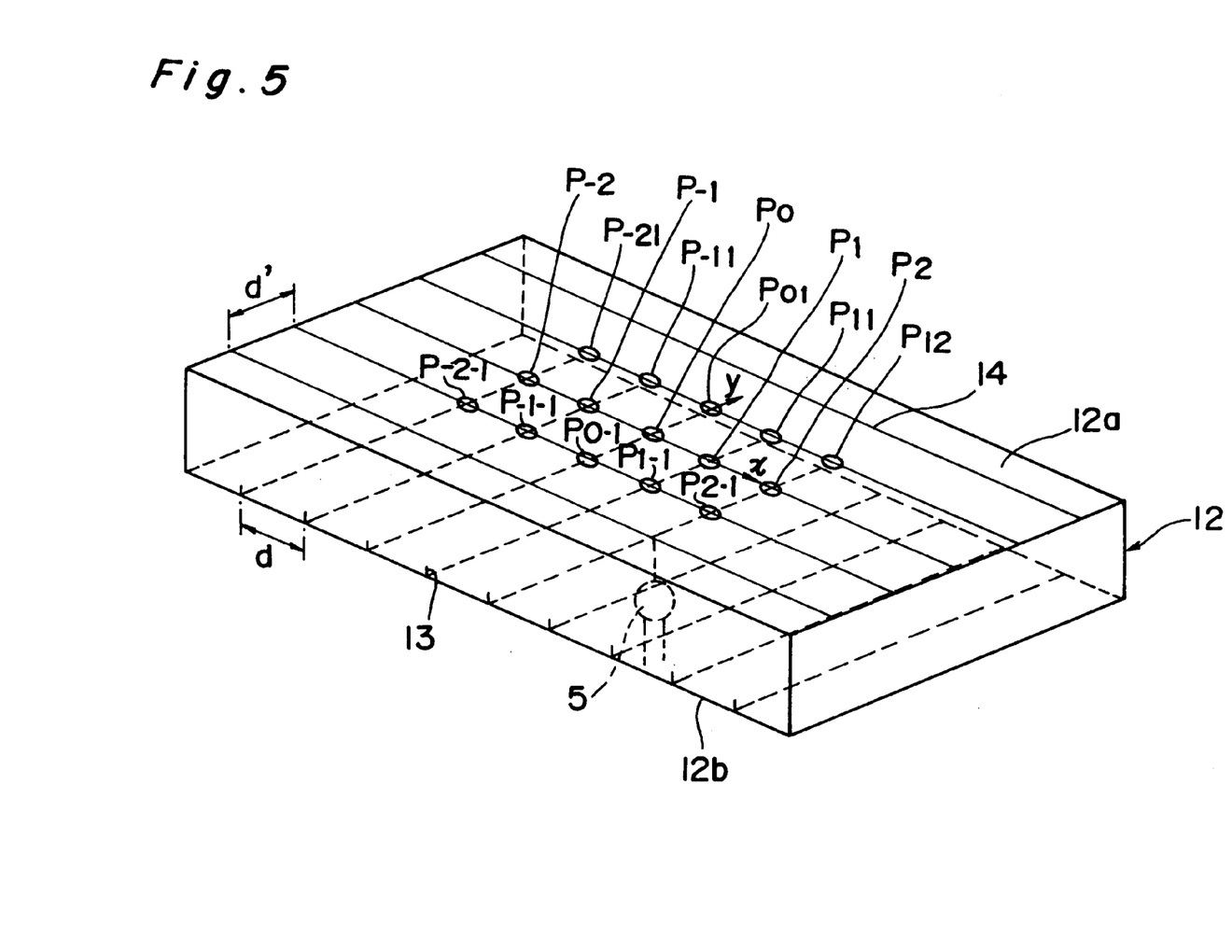
FIG. 5 is a perspective view showing an embodiment of the light guide plate as described in claim 2 of the present invention.

In this light guide plate, when a point light source is present on the rear surface side of the transparent plate member, diffraction gratings provided on the front surface and the rear surface of this plate member so as to be perpendicular to each other become both transmission type. Light from the point light source is diffracted by the diffraction grating of the rear surface of the plate member so as to spread at angles that are increasing with increasing number of order m within a plane perpendicular to the ruled grooves of this diffraction grating, as shown in FIG. 1B, according to the above-stated grating equation (1), thus making a row of bright spots $P_{-2}$, $P_{-1}$, $P_0$, $P_1$, $P_2$ on the front surface of the plate member as shown in FIG. 5 as an example. Further, the diffracted light from the rear surface that form these bright spots is diffracted also as shown in FIG. 1B by the diffraction grating of the front surface of the plate member, within a plane formed by lines perpendicular to the individual ruled grooves of this diffraction grating and each of the above diffracted light, resultantly making sets of rows of bright spots in FIG. 5 . . . ; $P_{-21}$, $P_{-11}$, $P_{01}$, $P_{11}$, $P_{12}$; $P_{-2}$; $P_{-1}$, $P_0$, $P_1$, $P_2$; $P_{-2-1}$, $P_{-1-1}$, $P_{0-1}$, $P_{1-1}$, $P_{2-1}$; . . . on the front surface of the plate member. The grating constants of the diffraction gratings on the rear surface and the front surface, or the cross-sectional shapes of the diffraction gratings, are such that the sets of rows of bright spots are distributed at an appropriate pitch on the whole front surface of the plate member, thus allowing uniform, high brightness on the front surface of the light guide plate to be obtained.

In an embodiment of the present invention, a diffusion plate for uniformizing diffracted light or turning any spectrally dispersed diffraction light back into white light through irregular reflection is provided on a front surface side of the light guide plate.

In an embodiment, if the light source is white light including light of various wavelengths λ, as apparent from the grating equation, diffracted light goes out as spectra as shown, for example, by the arrows R, G, B in FIG. 6. The outgoing spectra are changed into the original white light by passing through the diffusion plate provided on the front surface side. Also, if the light source is monochromatic light, the diffracted light becomes more uniform by passing through the diffusion plate. Accordingly, even when a small number of monochromatic light sources or white light sources are used, the surface of the light guide plate can be illuminated with more uniformity and higher brightness by even more uniform monochromatic light or undispersed white light.

BRIEF DESCRIPTION OF THE DRAWINGS

The present invention will become more fully understood from the detailed description given hereinbelow and the accompanying drawings which are given by way of illustration only, and thus are not limitable of the present invention, and wherein:

FIGS. 1A and 1B are schematic views showing theoretically the diffraction of light by diffraction gratings provided on the front and rear surfaces of a light guide plate;

DETAILED DESCRIPTION OF THE PREFERRED EMBODIMENTS

The present invention is now described in detail by embodiments thereof as illustrated in the accompanying drawings.

FIG. 2 is a perspective view showing one embodiment of the light guide plate as described in claim 1 used for backlight of a liquid crystal display. The light guide plate 2 made of transparent plastic resin, in which a rear surface 2a is inclined at an angle of 0.5 to 5° to a front surface 2a so as to be able to receive light incident generally horizontally from three light-emitting diodes 5 provided as point light sources at a thicker end side edge 2c, has a diffraction grating 3 formed by molding as fine ruled grooves on the rear surface 2b and a diffraction grating 4 formed by molding on the front surface 2a so as to be perpendicular to the diffraction grating 3 of the rear surface 2b. A grating constant d of the diffraction grating 3 is so set, as already described for the equation (1), that rays of low-order diffracted light go out from the front surface 2a generally perpendicular thereto and in concert in a direction of total reflection.

Also, the ratio of grating part width/non-grating part width in unit width of the diffraction grating 3 is set so as to increase gradually with increasing distance from the end edge 2c in order that the quantity of diffracted light increases with decreasing quantity of reached light from the light-emitting diodes 5. The term "unit width" herein refers to the sum of the width of one grating part and the width of one non-grating part, that is, the width of a unit division. On the rear surface 2b of the light guide plate 2 of FIG. 2, schematically shown eleven divisions each having the unit width are provided, where the grating part width is shown by heavy line part of each division and the non-grating part width is shown by thin line part of each division. As the distance from the end edge 2c increases, the ratio of heavy line in each division, i.e. grating part width, increases, making it understood that the quantity of diffracted light increases. In the above, the unit division, although eleven in number for explanation's sake, is actually provided in far greater numbers, for example, around 1000.

The diffraction grating 3 of the rear surface 2b is provided, in this embodiment, in an arrangement that grating part and non-grating part are provided divisionally right and left in each unit width. However, it is also possible that the two parts are alternately provided in one unit width so that a specific ratio of grating part width/non-grating part width can be obtained in the unit width. Further, the ratio of grating part width/non-grating part width is not necessarily gradually increased with increasing distance from the end edge 2c as in FIG. 2, but may be changed optionally as far as high-intensity, uniform bright lines on the surface can be obtained.

In the diffraction grating 4 of the front surface 2a, on the other hand, the grating constant d' is set to a fixed value as small as half the mean grating constant d of the diffraction grating 3 of the rear surface 2b, so that bright lines L by the diffraction grating 3 of the rear surface are diffracted so as to be largely spread laterally as shown by $D_0'$, $D_1$, $D_{-1}'$, $D_2'$, $D_{-2}'$, $D_3'$, $D_{-3}'$ of FIGS. 1B and 2, illuminating between adjacent bright lines L, L with high, uniform brightness. As a result, a uniform, high-intensity illuminating surface 2a can be obtained.

In this embodiment, the diffraction gratings 3, 4 of the front surface 2a, rear surface 2b, whose grating constants d, d' are several $\mu$m, are formed simultaneously with the light guide plate by using metallic dies in which ruled grooves are machined in the cavity surface. Herewith the diffraction gratings of the present invention may be ones whose grating constants d, d' are 0.1 to 10 $\mu$m which can also be fabricated by in-molding method in which hologram coatings for the diffraction gratings are inserted, direct machining process of ruled grooves onto the rear surface of the light guide plate, or bonding diffraction grating printed or holographically formed onto the rear surface of the light guide plate.

Figure 4A:
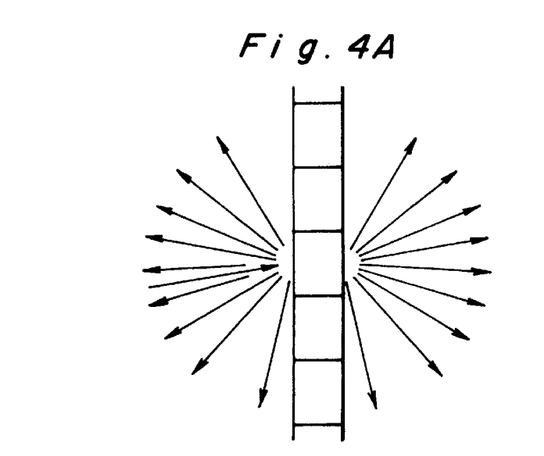
FIGS. 4A to 4E are schematic views showing the relationship between the intensity of diffracted light and the grating constant as well as cross-sectional shape of the diffraction grating.
Figure 4B:
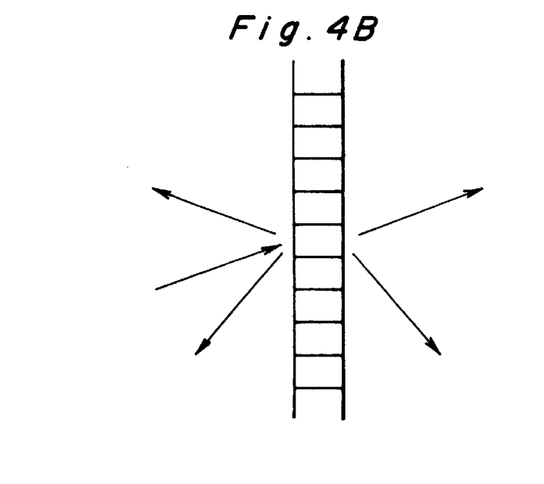
Figure 4C:
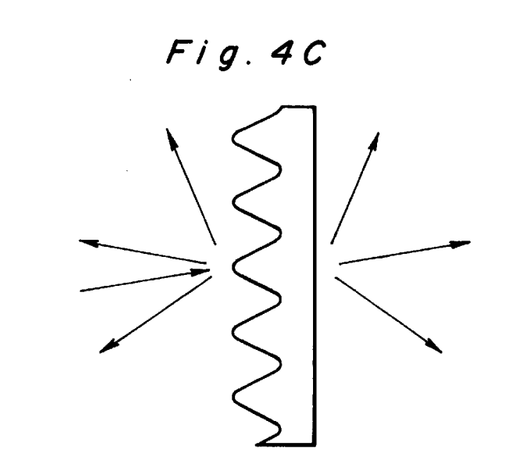
Figure 4D:
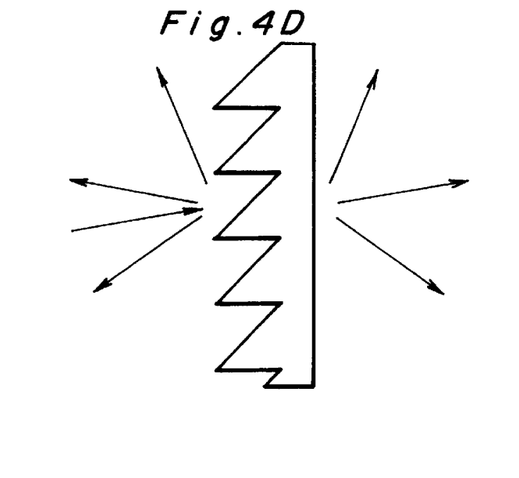

In addition, the above diffraction grating 4 of the front surface 2a having the above grating constant d' may be substituted by a diffraction grating having a sawtooth cross-sectional shape shown in FIG. 4D in which the angle of teeth is adjusted so as to allow higher-order rays of diffracted light with large m values in the grating equation (1) to be diffracted at high efficiency. In this case, the intensity of higher-order diffracted light spreading outside at a large angle increases so that uniform, high-intensity illuminating surface 2a can be obtained like the aforementioned case.

Figure 3:
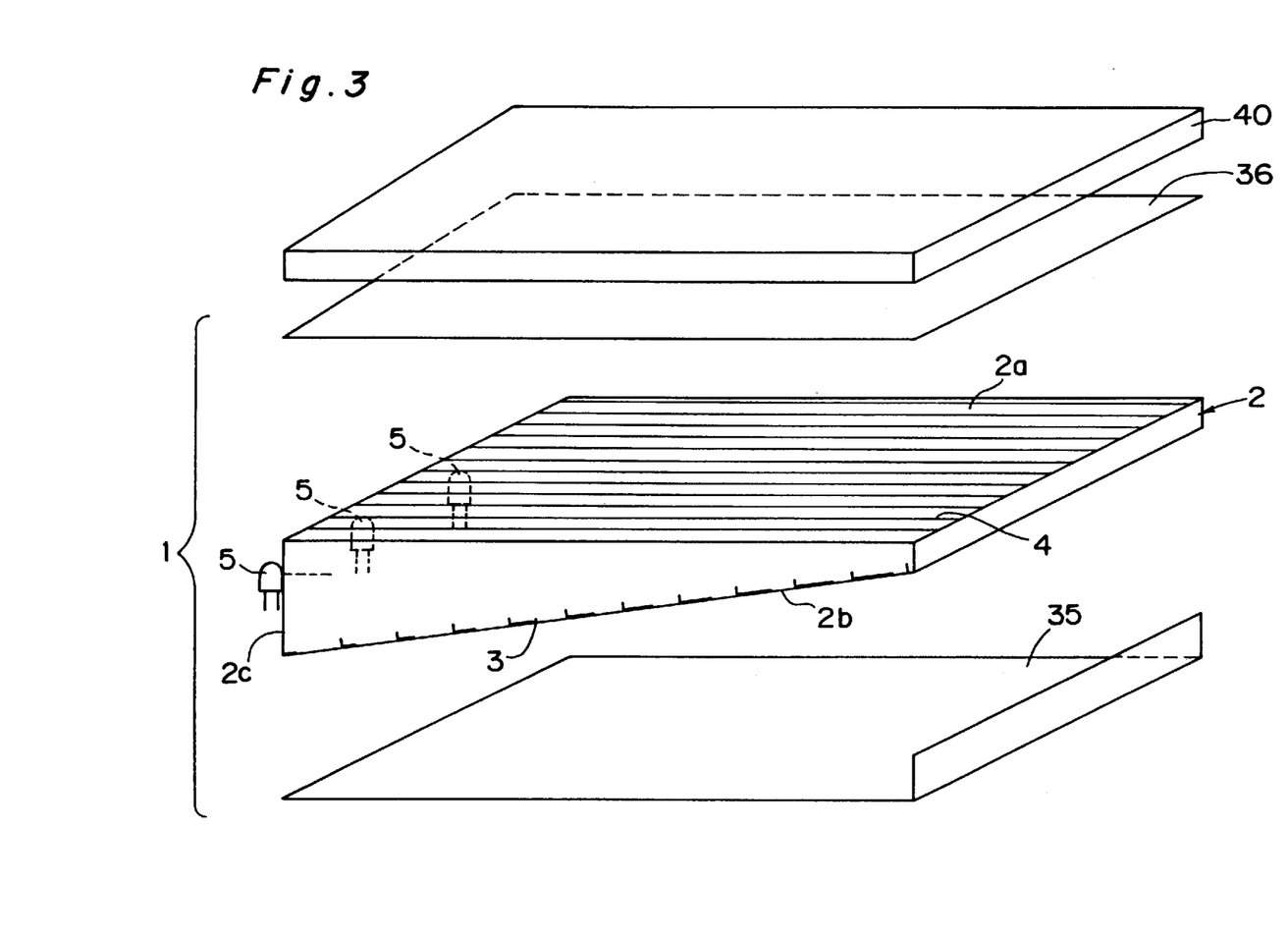
FIG. 3 is an outlined exploded perspective view of a liquid crystal display in which the light guide plate of FIG. 2 is used for the backlight.

FIG. 3 shows an example of a liquid crystal display in which the light guide plate of FIG. 2 is used for the backlight. This liquid crystal display comprises a liquid crystal panel 40, and a planar surface illuminator 1 which is composed of a diffusion plate 36 for further uniformizing the diffracted light uniformly spread over the entire front surface 2a by the diffraction grating 4 of the front surface of the light guide plate 2, the light guide plate 2, and a reflector 35 for reflecting light, the components of the planar surface illuminator 1 being provided below and parallel to the liquid crystal display panel 40 one by one.

The above members except the light guide plate 2 are the same as in the prior art described with reference to FIG. 6, and like members are designated by like reference numerals and omitted in description. In addition, the reflector 35 surrounds and covers the light guide plate 2 except the front surface 2a as well as the light-emitting diodes 5, as in FIG. 6.

The planar surface illuminator 1 having the light guide plate 2 of the above constitution illuminates the liquid crystal display panel 40 in the following manner.

Monochromatic light emitted from the light-emitting diodes 5 enters the light guide plate 2 generally horizontally at the end edge 2c, impinges on the whole rear surface 2b inclined at an angle of 0.5 to 5°, and is diffracted in cooperation of adjacent smooth surfaces among the multiplicity of ruled grooves of the diffraction grating 3 provided over the whole rear surface 2b, by which intense, low-order (e.g., 2nd- or 3rd-order) diffracted light is directed toward the generally normal direction of the front surface 2a of the light guide plate 2. While, intense, lower-order (e.g., 1st-order) diffracted light is totally reflected internally and led within the light guide plate 2. Accordingly, because the diffraction grating 3 has a synergistic cooperating effect of the multiplicity of fine ruled grooves whose spacing is on the order of $\frac{1}{100}$ of the length of one side edge of the conventional trigonal-pyramid prism, considerably highly intense diffracted light can be obtained, than in the case of the conventional multiplicity of trigonal-pyramid prism or the like whose one side edge is long as much as 0.16 mm and in which rays of light are totally reflected individually and merely as sums of light quanta of geometric optics without cooperation with neighborhoods. In addition to this, because grating part width/non-grating part width in unit width of the diffraction grating 3, i.e., the diffraction efficiency of the grating (ratio of diffracted light intensity to incident light intensity) increases with increasing distance from the end edge 2c of the light-emitting diodes 5, the quantity of diffracted light increases in proportion to the decreases in the quantity of light due to the distance from the light-emitting diodes. Therefore, without the diffraction grating 4 on the surface of the light guide plate 2, high-intensity, uniform bright lines L extending from the light-emitting diodes 5 (see FIG. 2) would appear on the front surface 2a.

However, on the front surface 2a of the light guide plate 2, the diffraction grating 4 perpendicular to the diffraction grating 3 of the rear surface 2b as shown in FIGS. 1B and 2 is provided at a fixed grating constant d', so that diffracted rays of light $D_2$, $D_3$ that appear as the bright lines L otherwise are diffracted, when going out, by the diffraction grating 4 of the front surface 2a. In this connection, as shown in FIG. 1B, with an angle of diffraction assumed as $\theta'$, because the incident angle i'=0, an equation $-\sin \theta' = \pm m (\lambda/d')$ holds from the aforementioned grating equation (1).

Because the grating constant d' of the diffraction grating 4 on the front surface is set to a fixed value smaller than the mean grating constant d of the diffraction grating 3 on the rear surface, the values of $\theta'$ satisfying the above equation for m=2, 3, respectively, are greater than the values of $\theta$, meaning that the angle of diffraction by the diffraction grating 4 on the front surface is greater than on the rear surface. Therefore, the diffracted light, or outgoing light, is largely spread as shown by $D_0'$, $D_1'$, $D_{-1}'$, $D_2'$, $D_2'$, $D_3'$, $D_{-3}'$ of FIGS. 1B and 2, illuminating between adjacent bright lines L on the front surface 2a with high, uniform brightness. Furthermore, because the diffusion plate 36 is provided above the light guide plate 2 as shown in FIG. 3, the diffracted light that has passed the diffusion plate 36 is further uniformized, thus illuminating the liquid crystal display panel 40 with great uniformity and high brightness.

In addition to this, because the light guide plate 2 except the front surface 2a as well as the light-emitting diodes 5 are covered with the reflector 35, almost all of light from the light-emitting diodes 5 can be let to be incident on the light guide plate 2, so that the liquid crystal display panel 40 can be illuminated with great uniformity and exceedingly high brightness. It is noted that although the point light sources are placed only at the thicker side end edge 2c of the light guide plate 2 in this embodiment, the point light sources may also be placed at both end edges of the light guide plate for higher brightness of the illuminating surface.

Figure 4E:
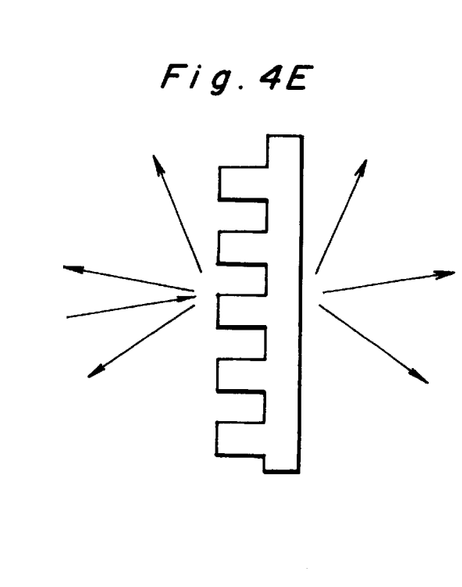

FIGS. 4A–4E schematically illustrate well known relations between luminance on the surface 2a of light guide plate 2, i.e., diffracted light intensity, and grating constant as well as sectional configuration of diffraction grating 3. It is noted, however, that in FIGS. 4A–4E, light is incident on the light guide plate in practically perpendicular relation thereto and not incident from one end of the light guide plate into the interior thereof as described above. It may be added that the schematics shown are made by T. K. Gaylord as presented at the Diffractive Optics Work Shop, held at Georgia Inst. of Tech., United States, in March 1996.

Where the grating constant is relatively large, as shown in FIG. 4A, diffraction occurs up to high order (see m in the diffraction equation (1)), but diffraction efficiency of each order is low. Where the grating constant is small, as shown in FIG. 4B, diffraction occurs only on a specified order, but diffraction efficiency is high. Next, where the grating is sinusoidal in sectional configuration as shown in FIG. 4C and as often seen with holographic diffraction gratings, diffraction efficiency is low. In the case of a grating having a sectional configuration of sawtooth as shown in FIG. 4D and as often seen with diffraction gratings formed by machining, the grating may be a blazed grating of the type as already described, in which the direction of total reflection of incident light coincides with the direction of diffracted light, and which provides high diffraction efficiency. Where the grating has a rectangular configuration as shown in FIG. 4E and is a so-called binary diffraction grating, diffraction efficiency is low.

Further, as already stated with reference to FIG. 2, any increase or decrease in the ratio of grating part width to non-grating part width in unit width of a light guide plate means an increase or decrease in the area of the diffraction grating, which results in an increase or decrease in diffraction efficiency.

In the above described embodiment, therefore, the grating part width/non-grating part width ratio in each unit width of the diffraction grating 3 is varied along the length of the light guide plate for uniforming the luminance on the surface 2a of the light guide plate. It is also possible to vary the sectional configuration of the diffraction grating in a similar manner thereby to uniform the luminance.

FIG. 5 is a perspective view showing an embodiment of the light guide plate as described in claim 2. A light guide plate 12 made of transparent plastic resin and having a thin-platy, rectangular parallelopiped shape has both transmission type diffraction gratings 13, 14 which receive light incident on a single light-emitting diode 5 provided in a lower center of a rear surface 12b as one or more point light sources, and which are molded on the rear surface 12b and the front surface 12a as fine ruled grooves so as to be perpendicular to each other. Grating constant d of the diffraction grating 13 and grating constant d' of the diffraction grating 14 are set to fiexed values so that uniform, high brightness can be obtained at the front surface 12a of the light guide plate 12, taking into consideration the wavelength $\lambda$ of the light-emitting diode in the grating equation (1), and the like. The relationship between the grating constants d, d' and the spreading of diffracted light is, as stated before, that the narrower the grating spacing, the more the diffracted light spreads, and that the wider the grating spacing, the less the diffracted light spreads.

Although not shown, the light guide plate 12 together with a diffusion plate 36 and a reflector 35 similar to those described with FIG. 3 form a planar surface illuminator which illuminates the liquid crystal display panel 40 from below.

The light guide plate 12 having the above construction illuminates the liquid crystal display panel 40 in the following manner.

Light from the light-emitting diode 5 enters the light guide plate 2 vertically at the rear surface 12b of the light guide plate 12, and is diffracted by the diffraction grating 13 so as to spread at angles increasing with increasing number of order m within a plane perpendicular to the ruled grooves of this diffraction grating, as shown in FIG. 1B, according to the grating equation (1), thus making a row of bright spots $P_{-2}, P_{-1}, P_0, P_1, P_2$ on the front surface 12a of the light guide plate 12 as shown in FIG. 5. Further, diffracted light from the rear surface 12b for making these bright spots is similarly diffracted as shown in FIG. 1B by the diffraction grating 14 of the front surface 12a of the light guide plate 12, within a plane formed by lines perpendicular to the individual ruled grooves of this diffraction grating 14 and the above diffracted light, thus resultantly making sets of rows of bright spots of FIG. 5 . . . ; $P_{-21}, P_{-11}, P_{01}, P_{11}, P_{12}; P_{-2}, P_{-1}, P_0, P_1, P_2; P_{-2-1}, P_{-1-1}, P_{0-1}, P_{1-1}, P_{2-1}; \ldots$ on the front surface of the plate member. The grating constants d, d' of the diffraction gratings 13, 14 on the rear and front surfaces are such that the sets of rows of bright spots are distributed at an appropriate pitch on the whole front surface 12a of the light guide plate 12, thus allowing uniform, high brightness on the front surface 12a of the light guide plate to be obtained. In addition, as to bright spots $P_{ij}$, as shown in FIG. 5, assuming that the intersecting point between a vertical line passing through the light-emitting diode 5 and the front surface 12a is taken as an origin, and that the direction of diffraction by the diffraction grating 13 on the rear surface is x while the direction of diffraction by the diffraction grating 14 on the front surface is y, then a suffix i represents an x-coordinate and a suffix j represents a y-coordinate.

Because the diffusion plate 36, the liquid crystal display panel 40 and the reflector 35 similar to those of FIG. 3, although not shown, are provided above and below the light guide plate 12, rays of light of those bright spots distributed at an appropriate pitch over the whole front surface 12a are diffused into a more uniform distribution. Thus, even with a singularity or small number of light-emitting diodes 5, the liquid crystal panel can be illuminated with further uniform and higher brightness.

The light guide plate 12 of FIG. 5, is generally thicker in thickness than the light guide plate 2 as described in FIG. 3, and further increased in total thickness with an extent of the light-emitting diode 5. However, because the light-emitting diode 5 is not so thick in size as conventional fluorescent tubes and besides the light-emitting diode is provided on the rear surface, the brightness of the front surface becomes brighter, as an advantage.

In addition, whereas the light-emitting diode 5 is provided singly in the embodiment of FIG. 5, it is also possible to provide some plurality of light-emitting diodes 5, in which case the surface of the light guide plate 12 can be illuminated with even greater brightness.

The diffraction gratings 13, 14 of the rear surface 12b and the front surface 12a of the light guide plate 12 in FIG. 5 have been so designed as to achieve uniform, high brightness at the front surface 12a by adjusting the grating constants d, d'. Also, alternatively, the diffraction gratings may also be designed to have a sawtooth shape, as an example, as described before, so that uniform, high brightness can be obtained.

In FIG. 5, the diffraction gratings 13, 14 of the rear surface 12b and the front surface 12a of the light guide plate 12 are formed by molding. However, as described before, these diffraction gratings may be fabricated by in-mold molding in which hologram coatings for the diffraction gratings are inserted, direct machining process of ruled grooves onto the rear surface of the light guide plate, or bonding diffraction grating printed or holographically formed onto the rear surface of the light guide plate.

In any of the embodiments described above, a light-emitting diode which emits monochromatic light has been employed as a light source. In another application, point light sources which emit white light may also be used, in which case with a diffusion plate provided on the front surface side of the light guide plate, spectrally dispersed rays by diffraction into R, G, B can be made into white light again by being passed through the diffusion plate, so that the liquid crystal panel can be illuminated successfully.

Further, the light guide plate of the present invention can also be used suitably not only for above-described liquid crystal displays, but also emission guide plates which have point light sources on one end face and in which an emergency exit mark is printed on the surface, as usually formed at building ceilings and the like.

As apparent from the above description, in the light guide plate as described in claim 1 of the present invention, the ratio of grating part width/non-grating part width in unit width, or cross-sectional shape, of the diffraction grating provided on the rear surface of the transparent plate member on which light from the point light source is incident at at least one end face of the light guide plate is changed, and the diffraction grating provided on the front surface of the transparent plate member is perpendicular to the diffraction grating of the rear surface and its grating constant is set to a fixed value smaller than the mean grating constant of the diffraction grating of the rear surface, or the cross-sectional shape of the diffraction grating of the front surface is set to such a fixed shape that high-order diffracted light is diffracted with high efficiency. Therefore, the light from the point light source is diffracted first by the diffraction grating of the rear surface as uniform bright lines extending from the point light source perpendicularly to this diffraction grating, and then by the diffraction grating of the front surface so as to spread at large angles in a direction perpendicular to this diffraction grating, thereby illuminating between adjacent bright lines with high, uniform brightness, so that the front surface of the light guide plate can be illuminated uniformly with high brightness. Accordingly, when this light guide plate is applied to battery-driven liquid crystal displays or liquid crystal televisions, emission guide plates indicating an emergency exit and the like, bright and uniform illumination can be obtained with compactness and exceedingly less power consumption than in the prior art, and moreover the light sources and the batteries can be prolonged in life, allowing longer-term use.

In the light guide plate as described in claim 2 of the present invention, the diffraction grating provided on the rear surface of the transparent plate member on which light from one or more point light sources is incident at the rear surface, and the diffraction grating provided on its front surface are perpendicular to each other, and besides the grating constants of the diffraction gratings, or the cross-sectional shapes of the diffraction gratings, are so set as to allow uniform, high brightness at the front surface of the light guide plate to be obtained. Therefore, the light from the point light source first is diffracted first by the diffraction grating of the rear surface radially within a plane perpendicular to the ruled grooves of the diffraction grating, thereby making a row of bright points, and then radially diffracted again by the diffraction grating of the front surface within a plane formed by lines crossing perpendicularly to the ruled grooves and the diffracted light derived from the rear surface, thereby making a matrix of bright lines. Thus, the surface of the light guide plate can be illuminated with high brightness and uniformity. Accordingly, when this light guide plate is applied to battery-driven liquid crystal displays or liquid crystal televisions, emission guide plates indicating an emergency exit and the like, bright and uniform illumination can be obtained with compactness and exceedingly less power consumption than in the prior art, and moreover the light sources and the batteries can be prolonged in life, allowing longer-term use.

In the light guide plate as described in claim 3 of the present invention, which accords to the light guide plate as described in claim 1 or 2, a diffusion plate for uniformizing diffracted light or changing separated diffracted light into white light by irregular reflection/refraction is provided. Therefore, when the point light source emits white light, the diffracted light going out from the light guide plate, although separated, is changed into the original white light by passing through the diffusion plate. Also, when the light source emits monochromatic light, outgoing diffracted light is made more uniform by passing through the diffusion plate. Accordingly, even if a small number of light sources of monochromatic light or light sources of white light are used, the front surface of the light guide plate can be illuminated with even more uniform, higher brightness by virtue of more uniform monochromatic light or unseparated white light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light guide plate comprising:

a transparent plate; and diffraction gratings provided on both rear and front surfaces of the plate and diffracting light incident from one or more point light sources at at least one end face of the plate; wherein a ratio of grating part width/non-grating part width in a unit width, or cross-sectional shape, of the diffraction grating of the rear surface is varied, and the diffraction grating of the front surface is provided perpendicularly to the diffraction grating of the rear surface, while grating constant of the grating on the front surface is set to a fixed value smaller than a mean grating constant of the diffraction grating on the rear surface or the cross-sectional shape of the diffraction grating on the front surface is set to such a specified shape that high-order diffracted light is diffracted at high efficiency, whereby uniform, high brightness at the front surface of the light guide plate can be obtained.

2. A light guide plate comprising:

a transparent plate; and diffraction gratings provided on both rear and front surfaces of the plate and diffracting light incident from one or more point light sources at a rear surface of the plate; wherein the diffraction grating of the front surface and the diffraction grating of the rear surface are provided perpendicularly to each other, while grating constants of the diffraction gratings, or cross-sectional shapes of the diffraction gratings, are so set that uniform, high brightness at the front surface of the light guide plate can be obtained.

3. The light guide plate according to claim 1, wherein a diffusion plate for uniformizing diffracted light or turning any spectrally dispersed diffraction light back into white light through irregular reflection/refraction is provided on a front surface side of the light guide plate.

4. The light guide plate according to claim 2, wherein a diffusion plate for uniformizing diffracted light or turning any spectrally dispersed diffraction light back into white light through irregular reflection/refraction is provided on a front surface side of the light guide plate.

* * * * *